Figure 1:
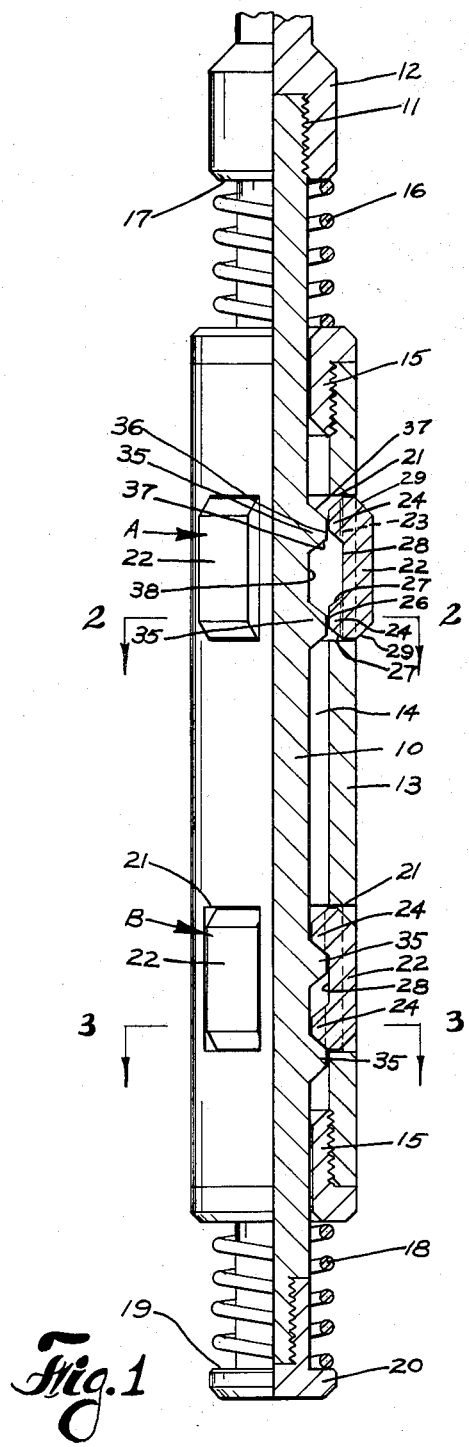

Dec. 24, 1963

C. B. COCHRAN ETAL 3,115,188

SHIFTING TOOL FOR WELL APPARATUS

Filed Nov. 15, 1961

6 Sheets-Sheet 1

CHUDLEIGH B. COCHRAN
JAMES D. MOTT
INVENTORS

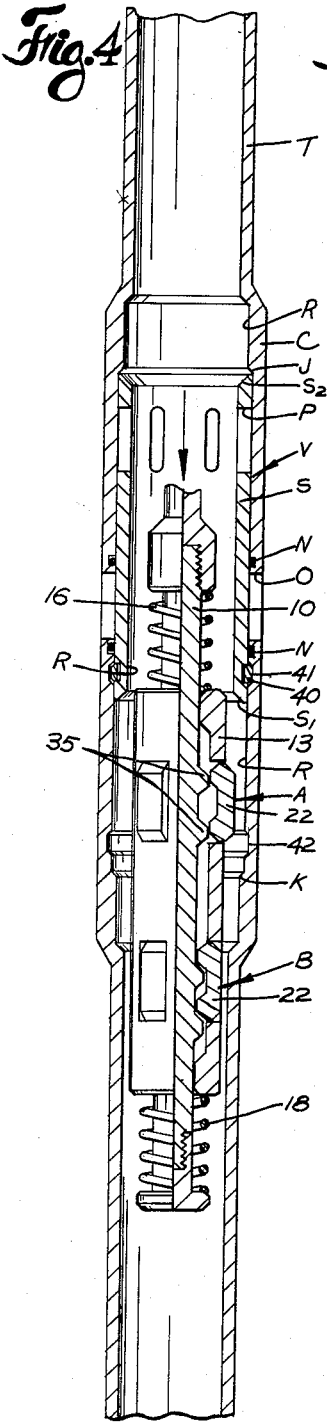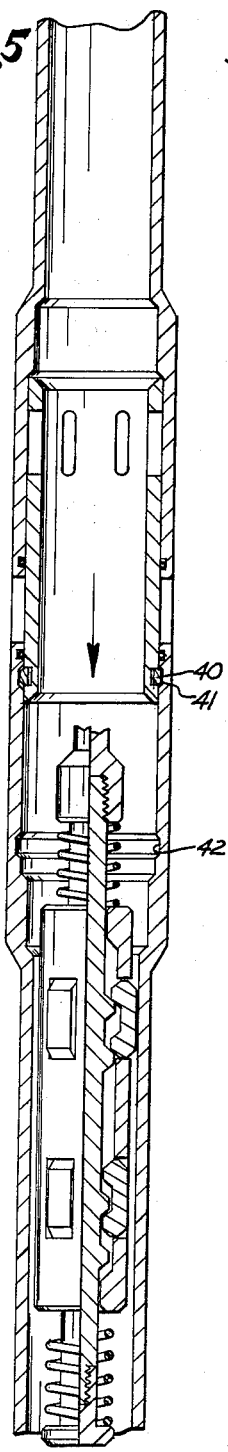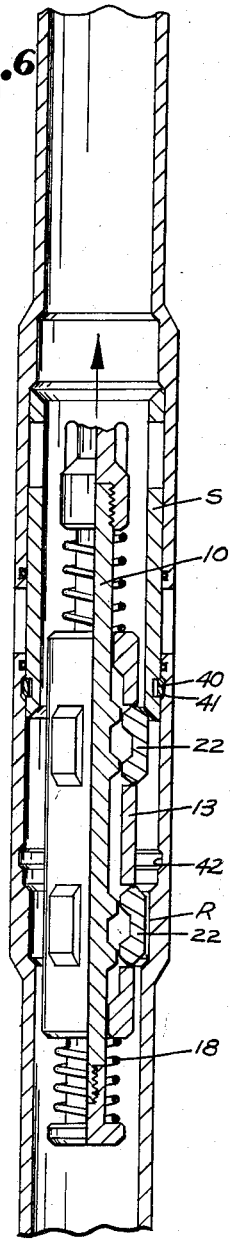

Dec. 24, 1963 C. B. COCHRAN ETAL 3,115,188
SHIFTING TOOL FOR WELL APPARATUS
Filed Nov. 15, 1961 6 Sheets-Sheet 3
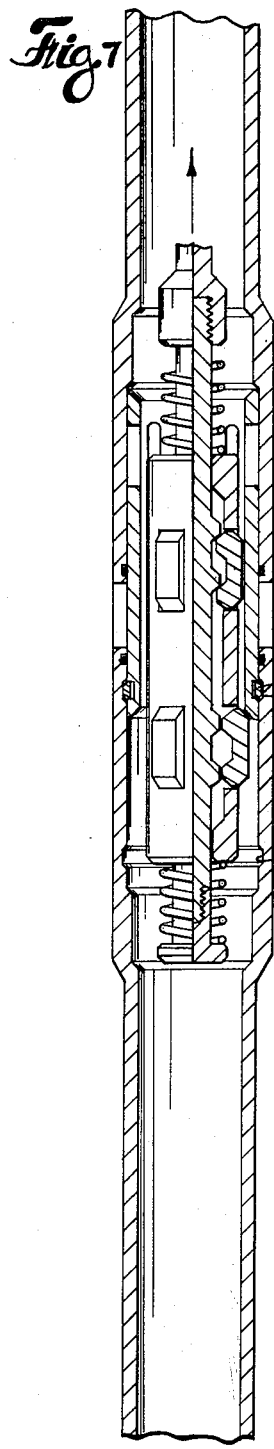
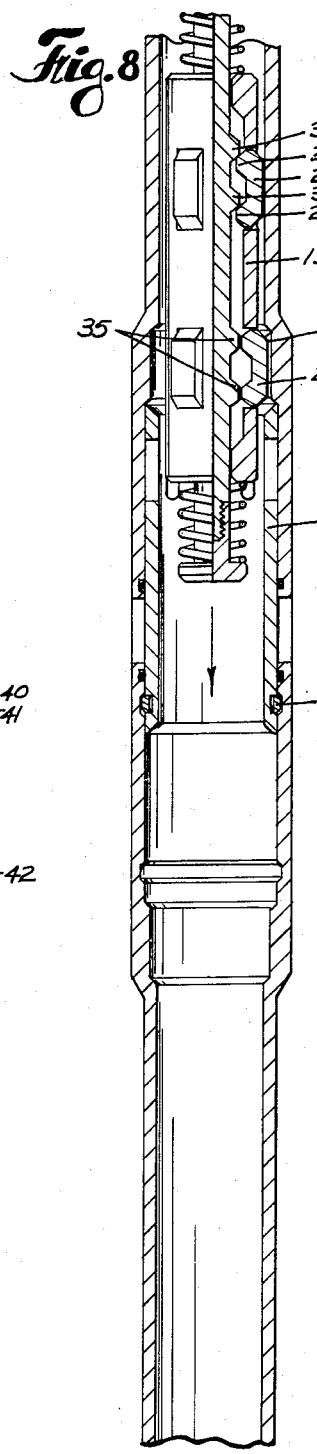
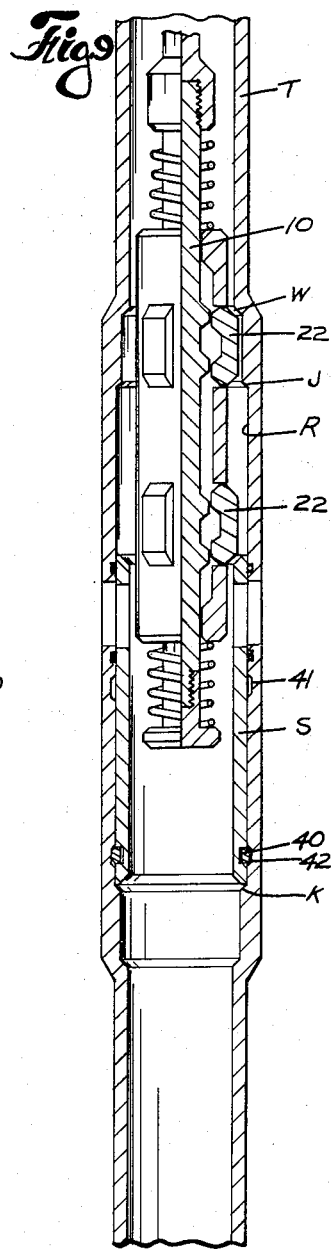
CHUDLEIGH B. COCHRAN
JAMES D. MOTT
INVENTORS
BY
ATTORNEYS

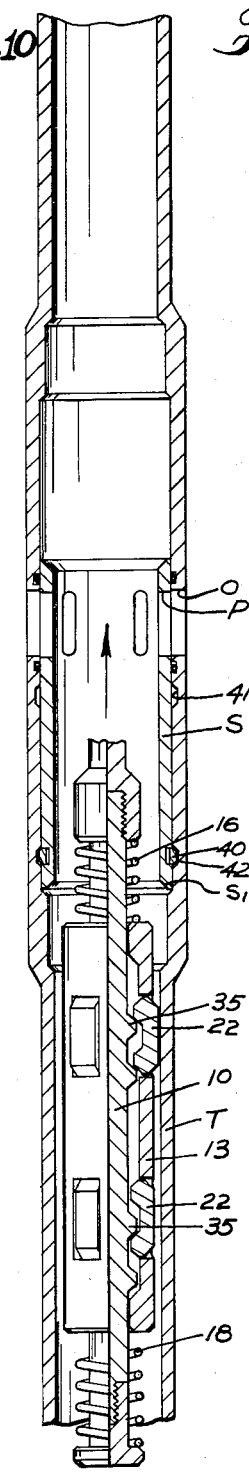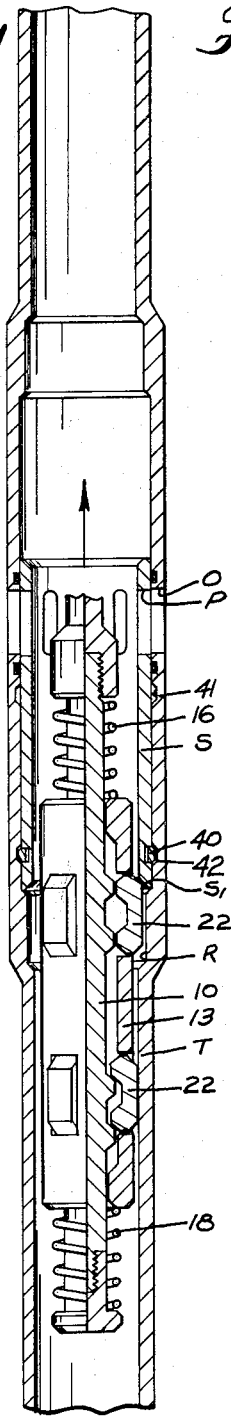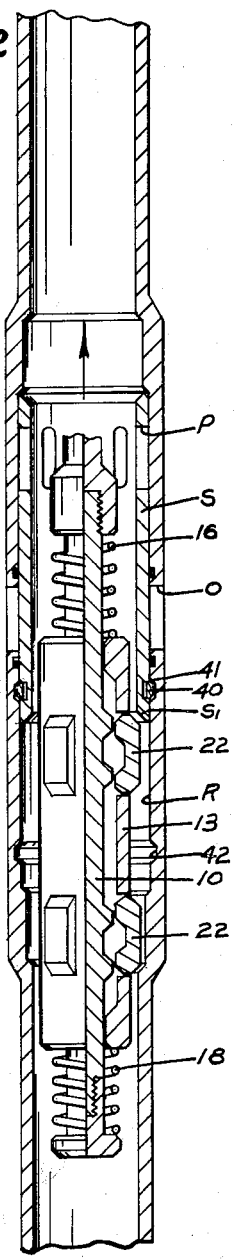

Dec. 24, 1963  C. B. COCHRAN ETAL  3,115,188
SHIFTING TOOL FOR WELL APPARATUS
Filed Nov. 15, 1961  6 Sheets—Sheet 5
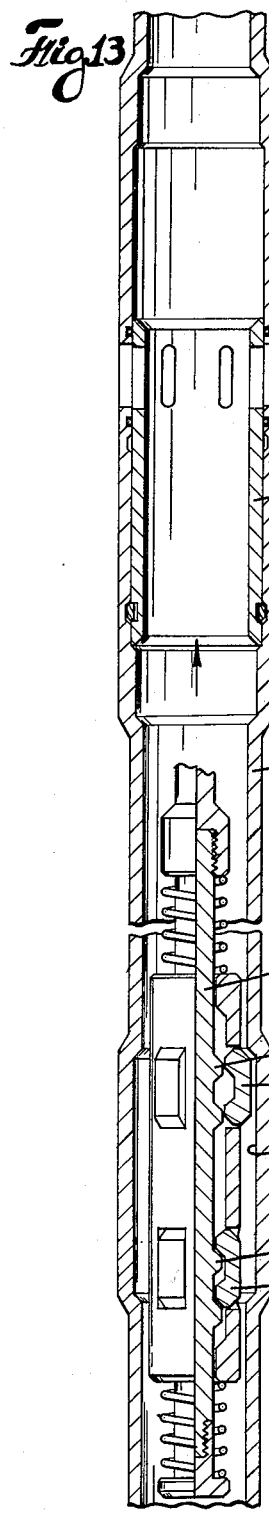
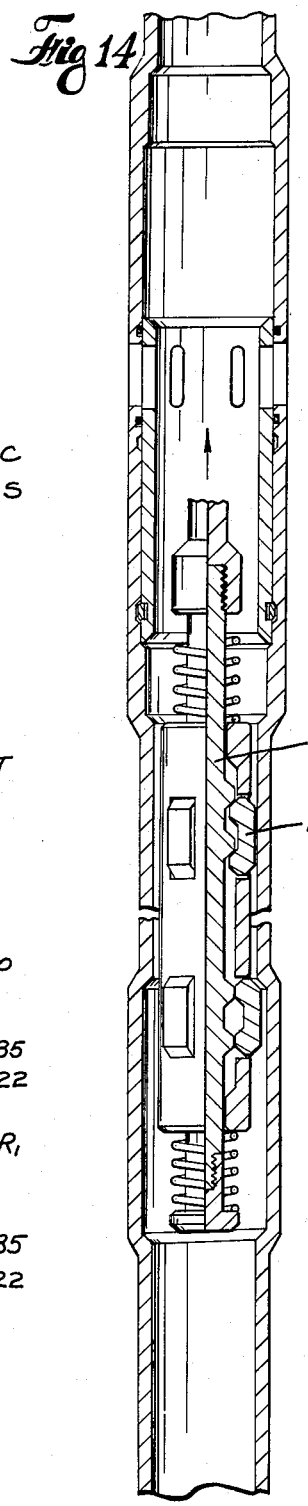
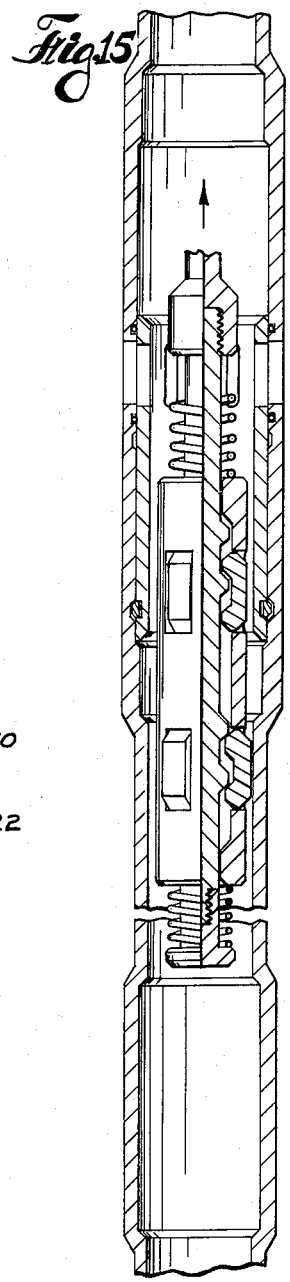
CHUDLEIGH B. COCHRAN
JAMES D. MOTT
  INVENTORS
BY
ATTORNEYS Dec. 24, 1963  C. B. COCHRAN ETAL  3,115,188
SHIFTING TOOL FOR WELL APPARATUS
Filed Nov. 15, 1961  6 Sheets-Sheet 6
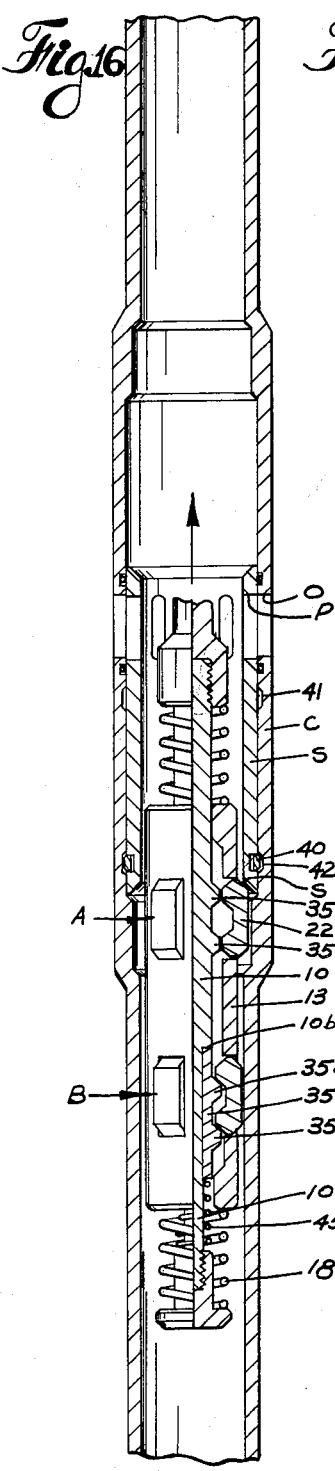
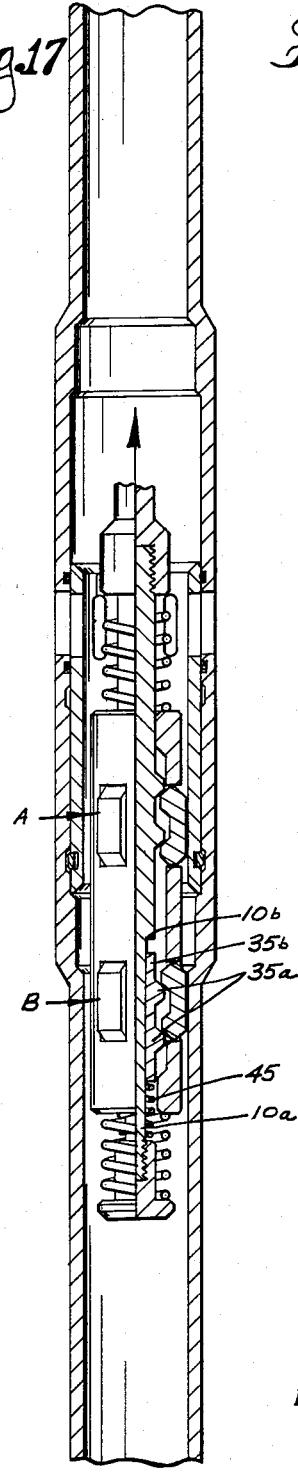
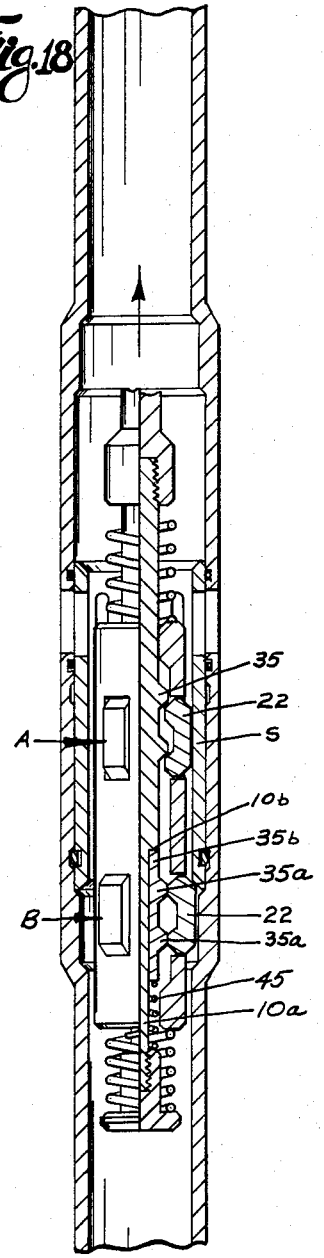
CHUDLEIGH B. COCHRAN
JAMES D. MOTT
INVENTORS
BY
ATTORNEYS

United States Patent Office 3,115,188
Patented Dec. 24, 1963

3,115,188
SHIFTING TOOL FOR WELL APPARATUS
Chudleigh B. Cochran and James D. Mott, Houston, Tex., assignors to Cicero C. Brown, Houston, Tex.
Filed Nov. 15, 1961, Ser. No. 152,599
9 Claims. (Cl. 166—224)

This invention relates to a shifting tool for use in oil and gas wells to shift well apparatus between spaced operating positions in a well pipe. More particularly, the present invention relates to a shifting tool for shifting a sleeve member, such as a sleeve valve between open and closed positions in a well pipe.

Many oil and gas well installations employ a plurality of longitudinally spaced sleeve valves in the production pipe string to open and close communication between the pipe string and spaced production strata or zones along the well bore. By selectively opening or closing the sleeve valves, production can be obtained from selected zones in the well. Generally, only one zone will be opened to production at one time and other zones will be opened in succession as the production in the previously opened zones is depleted. In some instances, more than one zone may be put in production at the same time.

Numerous types of sleeve valves are in use and various types of shifting tools have been devised for operation in cooperation with such valves for opening and closing them. The shifting tools are usually run on wire lines and are run commonly in conjunction with weight bars, jars and the like, for effecting the desired movements of the sleeve valve.

The more conventional shifting tools are relatively complicated, employing various forms and shapes of pivoted lugs or dogs together with actuating elements to extend or retract such dogs for engaging the sleeve valve and moving it upwardly or downwardly, as may be required, in opening or closing the valve. In general, such conventional devices employ structures involving relatively square shoulders both on the sleeve valve and on the shifting tool elements for effecting the necessary engagement for movement of the valve. Shoulders of such flat or square shape frequently cause difficulty in running well tools through the valve, as well as in running the shifting tools themselves. Further, many production strings are coated internally with a plastic coating to prevent corrosion and the use of shifting tools employing parts having relatively sharp corners will frequently cut or damage such coating when the shifting tool is run in or out of the bore of the well pipe. Moreover, because of their relatively complicated construction, employing usually quite a number of small parts, including pivot pins, small springs and the like, the conventional tools are subject to breakage in use, with resulting loss of the lugs or pawls and other parts into the well with consequent damage to the well.

The present invention has for its principal object the provision of an improved form of shifting tool which is of very simple compact construction employing an absolute minimum number of parts, all of which are of relatively heavy and rugged construction.

An important object is to provide an improved shifting tool in which all corners of the parts adapted to engage the valve or tool to be shifted are bevelled and enable employment in the valve, or other apparatus to be shifted, of engaging surfaces which are similarly bevelled, thereby avoiding the employment of any sharp or square surfaces which might hinder proper running of the shifting tool, and which might otherwise damage wall coatings in the pipe string.

A further object is the provision of a shifting tool in which movement of the pawls or dogs into and out of engagement with the apparatus to be shifted is positive and direct.

An additional object is to provide a shifting tool which, when employed to move a sleeve, will provide a positive indication that the sleeve has been fully shifted.

Still another object is to provide a shifting tool which after shifting one sleeve valve may be re-set without removing from the well for shifting another valve.

Yet another object is to provide a shifting tool which may be employed to selectively shift one of a plurality of sleeve valves in a well pipe.

Other and more specific objects and advantages of this invention will become more fully apparent from the following detailed description when read in conjunction with the accompanying drawing which illustrates several useful embodiments in accordance with this invention.

Figure 2:
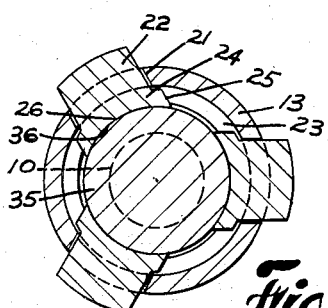
Figure 3:
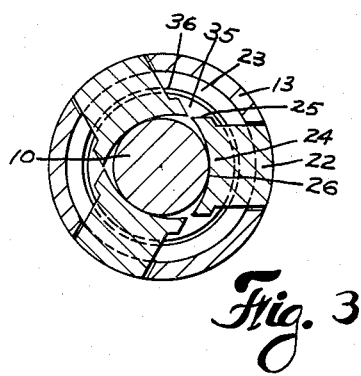

In the drawing:

FIG. 1 is a longitudinal-quarter-sectional view of one embodiment in accordance with this invention;

FIGS. 2 and 3 are cross-sectional views taken generally along lines 2—2 and 3—3, respectively, of FIG. 1;

FIGS. 4 to 15, inclusive, are diagrammatic views showing different positions of the shifting tool in effecting movement of a sleeve valve; and FIGS. 16 to 18, inclusive, are views generally similar to FIGS. 13 to 15, inclusive, illustrating a modified form of the tool in accordance with this invention, showing the tool at different stages of operation.

Referring first to FIGS. 1 to 3, the shifting tool comprises a mandrel 10 threaded at its upper end at 11 for reception in a threaded socket 12 provided at the lower end of a conventional wire line tool string (not shown) by means of which the tool is run into a well. The lower end of socket 12 defines a downwardly facing shoulder 17 about the upper end of the mandrel. It will be understood that the wire line tool string may include the usual weight or sinker bars, wire line jars, and other devices usually employed in such tool-running strings. Surrounding mandrel 10 and mounted for limited relative longitudinal movement thereon, is a tubular housing 13 having an internal diameter somewhat larger than the external diameter of mandrel 10 to provide the annular space 14 therebetween. Tubular bushings 15—15 are screwed into the upper and lower ends of housing 13 to form a close but free sliding fit about the exterior of mandrel 10. A first coil spring 16 surrounds the upper end portion of mandrel 10 and is disposed in compression between the upper end of upper bushing 15 and shoulder 17. A second coil spring 18 is mounted about the lower end portion of mandrel 10 in compression between the lower end of lower bushing 15 and an annular flange 19 provided on a cap 20 which is threadedly secured to the lower end of mandrel 10. Springs 16 and 18 are of substantially equal strength and tend to resiliently bias housing 13 in opposite directions relative to mandrel 10.

Housing 13 is provided with upper and lower sets of angularly spaced, generally rectangular windows 21, the sets being longitudinally spaced apart along body 13. The angular spacing between the windows is preferably uniform and will depend upon the number of windows in each set. In the embodiment illustrated, three windows are shown spaced 120° apart. A pawl or dog 22 is mounted in each of the windows for radial sliding movement therein. For purposes of this description the upper and lower sets of dogs 22 will be designated A and B, respectively. Each of dogs 22 is rectangular in shape, being generally complementary to the shape of the window in which it is mounted. On its inner face each dog is provided at its upper and lower ends with a pair of longitudinally spaced inwardly projecting lugs 24 which extend transversely of the dog and overhang its opposite side edges to form the lateral projections 25 (FIGS. 2 and 3), the latter being adapted to seat in recesses 23 formed by undercutting the inner wall of housing 13 about the periphery of the windows. Each of the lugs 24 has an inner end face 26 which is arcuate in horizontal section and of regular trapezoidal form in longitudinal cross section, end face 26 being joined to the body of the dog by sloping upper and lower faces 27—27. The spacing between each pair of lugs 24 defines a recess 28 therebetween, the end walls of the recess being formed by the opposed faces 27. The upper and lower edges 29—29 of the outer end face of each dog are bevelled at a suitable angle, usually from about 40° to about 45°, which is also the preferred range of angles for faces 27 of the lugs.

Mandrel 10 is provided with two spaced sets of circular shoulders or lugs 35 of substantially the same geometric shape in longitudinal cross-section as lugs 24, having flat end faces 36 and bevelled upper and lower faces 37—37, the lugs of each pair being separated by the recesses 38. The length of recesses 38 is substantially the same as that of recesses 28, however, the spacing between the upper and lower sets of the lugs 35 is greater than that between the pairs of lugs 24 on the upper and lower dogs A and B. This difference in spacing is equal to approximately the average longitudinal thickness of one of the lugs. As a result of this spacing arrangement, it will be seen that when end faces 36 of upper lugs 35 on the mandrel are in abutting engagement with end faces 26 of lugs 24 of the upper dogs 22, lower lugs 35 on the mandrel will be out of registration and axially interspersed with lugs 24 of the lower dogs, as seen in FIG. 1. Alternatively, when lower mandrel lugs 35 are in registration with the lugs on the lower dogs, the upper sets of lugs will be out of registration and interspersed. In the position illustrated in FIG. 1, which is the so-called "uncocked" position of the tool, the uppermost lug 35 of the lower set of these lugs will be disposed in recesses 28 between the lugs 24 on the lower dogs B while the lowermost one of the lugs 35 of the lower set on the mandrel will be below the lower lug 24 of the dog. Thus, at no positions of the mandrel and housing will both sets of lugs on the mandrel be in abutting registration with the lugs on both sets of dogs 22, although at one relative position of the mandrel and housing, both sets of lugs may be out of registration and in interspersed relation. The significance of this offset arrangement of the lugs in the functioning of the device will appear hereinafter. Further, it will be noted that when a set of the lugs 35 is in radial abutting registration with a set of the lugs 24, the related dogs 22 will be radially projected from their enclosing windows, and that when the lugs 35 are out of registration with lugs 24, the related dogs 22 will be freed for retraction inwardly of their enclosing windows 21.

Operation of the device will now be described, reference being had particularly to FIGS. 4 to 15, wherein the operation of the device when employed for shifting a sleeve valve is illustrated. In these figures, there is shown a production pipe string T fitted with a conventional sleeve valve, designated generally by the letter V. The latter comprises a generally tubular casing C having radial ports O and a sleeve valve S having radial ports P slidable on the interior of casing C. The latter is provided with an elongated internal annular recess R in which sleeve valve S is slidable between upper and lower shoulders J and K, respectively, which limit the extent of travel of the sleeve valve, the latter being shorter in length than recess R by an amount such that when the lower end $S_1$ of the sleeve valve is in engagement with, or in close proximity to, lower shoulder K, ports P will be in registration with ports O, and when the upper end $S_2$ of sleeve valve S is in engagement with or in close proximity to shoulder J, the ports will be out of registration. Seal rings N—N are disposed above and below ports O between the surface of recess R and the exterior of sleeve valve S to seal off between these members about the ports O. A conventional split latch ring 40 is suitably mounted in the exterior of valve S near its lower end and is adapted to cooperate with longitudinally spaced upper and lower latching grooves 41 and 42 in the wall of recess R below ports O to releasably secure valve S in its closed and open positions, respectively. The depth of recess R is sufficient to permit dogs 22 to be projected into the recess when lugs 24 are in engagement with lugs 35, whereas, the thickness of dogs 22 is such that when in projected position the overall diameter of the projected dogs will be greater than the internal diameter of pipe string T, thus requiring that dogs 22 be collapsed or retracted inwardly to permit the shifting tool to move through the bore of pipe string T.

When the device is initially introduced into pipe string T, the upper dogs A will be in their projected position, while the lower dogs B will be retracted and lugs 24 thereon will be above the respective mandrel lugs 35 of the lower set, as best seen in FIGS. 1 and 4. However, since the internal diameter of the pipe string will not accommodate the fully projected dogs, resistance will be offered to the movement of the tool by engagement of the dogs with the wall of the pipe and the resulting friction will tend to hold housing 13 stationary while allowing relative downward movement of mandrel 10, thereby compressing upper coil spring 16. This relative downward movement of the mandrel will cause upper mandrel lugs 35 to move downwardly sufficiently to move past and underlie lugs 24 of the upper dogs A. The extent of this movement will be accommodated by the difference between the length of recesses 28 in the lower dogs B and the longitudinal thickness of lower mandrel lugs 35. Thus, both sets of dogs 22 will be in their retracted positions and their respective lugs 24 will overlie the corresponding lugs 35 on the mandrel. These relative positions of the lugs are illustrated in FIG. 5. With the dogs thus fully retracted, the shifting tool will be in its uncocked position and can move downwardly through the pipe string and through as many of the valves V as desired in those instances where more than one of the valves V is installed in the pipe string. In the case of a single valve, as illustrated, the uncocked shifting tool can travel downwardly entirely through the closed valve.

To cock the shifting tool, that is, to position dogs 22 for applying downward shifting force to sleeve valve S, it is necessary that the shifting tool be passed downwardly entirely through the closed valve (FIGS. 4 and 5) and then retracted to the position illustrated in FIG. 6. In the latter, as the running string is drawn upwardly, lifting the shifting tool, both sets of dogs 22 will enter recess R below the lower end $S_1$ of valve S. The upward movement of the tool string will tend to draw mandrel 10 upwardly with respect to housing 13 and as lugs 35 pass lugs 24, they will tend to project upper dogs A outwardly so that the upper dogs will engage the lower end $S_1$ of valve S (FIG. 6). This will retard the upward movement of housing 13 and produce relative upward movement of mandrel 10 causing compression of lower spring 18, and allowing both sets of the mandrel lugs to pass the related lugs on the upper and lower sets of dogs A and B, thus successively tripping mandrel lugs 35 past the lugs 24, as illustrated in FIGS. 7 and 8, until the shifting tool has moved above the upper end $S_2$ of sleeve valve S, as shown in FIG. 8. At this stage, upper mandrel lugs 35 will have moved above the corresponding lugs 24 of the upper dogs, allowing the upper dogs to retract so that the upper portion of the tool may enter the bore of the pipe string and hold upper dogs A in the retracted position. The lower set of lugs 35 will be in registration with and will be projecting lower dogs B radially into the upper end of recess R. The shifting tool is now in the so-called "cocked" position in which upper lugs 35 are now above the corresponding lugs 24 so that downward movement of the tool string will cause lower dogs B to abut the upper end $S_2$ of sleeve valve S. Since, in this position, lower dogs B will be in their radially projected position and will be held in that position by abutment with lower mandrel lugs 35, the projected lower dogs A will engage upper end $S_2$ of the valve. Downward jarring action may now be applied to the mandrel and this will be transmitted from upper lugs 35 to the lugs 24 of upper dogs A, and thence through housing 13 and lower dogs B against the upper end $S_2$ of sleeve valve S, driving the latter downwardly sufficiently to release lock ring 40 and move the sleeve valve to its lowermost position where lock ring 40 will seat in lower lock ring groove 42, thus latching the sleeve valve in its open position, as seen in FIG. 10.

As the sleeve valve moves to its fully open position (FIG. 9) under the impacts of the shifting tool, both sets of dogs A and B will momentarily be positioned opposite recess R, thereby releasing the mandrel lugs so that the final impacts which drive the sleeve valve to its open position will trip the mandrel lugs past the lugs on the dogs, allowing the latter to collapse and permitting the shifting tool to move downwardly below the sleeve valve, the shifting tool being thereby returned to its uncocked condition. This release of the mandrel followed by downward movement of the shifting tool provides a positive signal to the operator that the sleeve valve has been shifted to the open position. However, since, as noted, the shifting tool will be in the uncocked position, as seen in FIG. 10, it cannot be withdrawn through the sleeve valve because upper dogs A would engage the lower end $S_1$ of the sleeve valve (FIG. 11) and any upward tension or impactive force on the tool string would cause the shifting tool to return the sleeve valve to the closed position, as illustrated in FIGS. 11 and 12. Thus, the sequence of operations shown in FIGS. 10, 11, and 12 will be effective to open a previously closed valve and is employed for this purpose when desired, as will appear hereinafter.

However, when, as noted, a valve has been moved to the open position, and it is desired to remove the tool string without closing the valve, the shifting tool is moved downwardly opposite a second annular recess $R_1$ (FIGS. 13 to 15) which may be positioned in tubing string T at any appropriate point below casing C, which has a length sufficient to receive both sets of dogs 22 at the same time. Where a series of valves V are positioned in the tubing string, each valve installation will include a recess $R_1$ positioned below the lower end of its casing C.

As seen in FIG. 13, both sets of dogs 22 being opposite recess $R_1$ and free to move outwardly, the lugs on the mandrel may be tripped past the lugs on the dogs by an upward pull on the mandrel following engagement of the upper set of dogs with the upper end wall defining recess $R_1$ (FIGS. 14 and 15). Both sets of dogs will thus be successively freed to collapse inwardly about the mandrel (FIG. 15) and may now pass through the bore of sleeve valve S so that the entire tool string may be withdrawn from the well.

FIGS. 16 to 18, illustrate a modification of the shifting tool by means of which the tool may be withdrawn from the tubing string without requiring a second "uncocking" or "turn-around" groove, such as groove $R_1$, below the sleeve valve. In this modification, the lower set of mandrel lugs 35a is mounted on a short sleeve 35b slidably disposed on a reduced diameter portion 10a of mandrel 10. The reduction in diameter defines the downwardly facing shoulder 10b which limits upward movement of sleeve 35b on the mandrel. A small coil spring 45 surrounds reduced diameter mandrel portion 10a and is arranged therein to bias sleeve 35b upwardly against shoulder 10b.

With this arrangement, when it is desired to withdraw the shifting tool without closing the valve, a pull will be applied to the tool string causing upper dogs 22 to engage the lower end $S_1$ of the sleeve valve. The resistance thus offered to further upward movement will collapse spring 45 (the strength of which is made much weaker than that of latch ring 40) and will allow mandrel 10 to move upwardly relative to housing 13, lugs 35a and sleeve 35b remaining inter-engaged with the lugs of lower dogs B. The relative upward movement of the mandrel will trip upper mandrel lugs 35 past the lugs of upper dogs A (FIG. 17), thereby allowing the latter to collapse inwardly, whereupon continued upward movement of the shifting tool will place both sets of dogs in collapsing position and allow the tool to be pulled upwardly through the sleeve valve.

Again referring to FIGS. 10 to 12, the positions of the parts of the shifting tool are shown preparatory to effecting closing movement of a previously opened sleeve valve. In this circumstance, the uncocked tool will have been run through the valve to a point below the valve and then both sets of dogs will be in their retracted position inside the bore of pipe T, as shown in FIG. 10. As the tool string is lifted upwardly, upper dogs A will enter the lower end of recess R, which will permit projection of the dogs into engagement with the lower end $S_1$ of sleeve valve S (FIG. 11), mandrel 10 moving upwardly sufficiently to project the upper dogs, while at the same time lower dogs B will remain in the bore of pipe string T and will necessarily be in the retracted position so that lower mandrel lugs 35 will be unable to pass above the lugs on lower dogs B and by reason of the difference in the spacing of the lugs of the mandrel and of the dogs, will necessarily maintain upper mandrel lugs 35 is registration with the lugs on upper dogs A, so as to positively hold the latter in their projected position to engage the lower end $S_1$ of sleeve valve S. Thereupon, upward jarring impacts on the tool string will be transmitted through upper dogs A to the lower end $S_1$ of the sleeve valve and will force sleeve valve S upwardly, releasing lock ring 40 from lower lock ring groove 42 and moving the sleeve valve to its closed position (FIG. 12), reseating lock ring 40 in upper lock ring groove 41. At this position of the sleeve valve, both sets of dogs 22 will have entered recess R below valve S, freeing them for radial projection and allowing mandrel 10 to be drawn upwardly relative to housing 13 so that the mandrel lugs will be out of registration with the lugs on both sets of dogs. This will allow retraction of both sets of dogs and permit the tool string to be withdrawn from the well.

From the foregoing it will be seen that the tool in accordance with this invention is of rugged construction, employing a minimum of relatively simple parts; which, by reason of its design, may employ bevelled engaging or impactive surfaces thereby reducing the danger of cutting or scratching the plastic protective coatings frequently present in pipe strings; which may be operated to selectively shift one or more of a plurality of sleeve valves either to the open or closed position as desired, without requiring removal of the tool from the well for re-setting; and which through manipulation of the wire line in operating the tool will provide the operator with a signal assuring him that the desired movement of the sleeve valve has occurred.

While the illustrative embodiment has been described in connection with the shifting of a sleeve valve, it will be evident that the shifting tool may be employed to shift any other type of sleeve member which may be slidably disposed in a well pipe.

It will be understood that various alterations and modifications may be made in the details of the illustrative embodiments within the scope of the appended claims but without departing from the spirit of this invention.

What we claim and desire to secure by Letters Patent is:

1. A wire line-operated shifting tool for use in longitudinally shifting a sleeve member in the bore of a well pipe, comprising, a mandrel member connectible to a wire line operating string, a tubular housing disposed for limited relative longitudinal movement about the mandrel member, two vertically spaced dog members mounted in the wall of the housing for radial movement between projected positions adapted to abuttingly engage the ends of said sleeve member and retracted positions permitting passage of the tool through the bore of the well pipe and said sleeve member, inwardly projecting shoulders on said dog members, shoulder means carried by the mandrel member positioned thereon to coact with said shoulders on said dog members in response to longitudinal movement of the mandrel member in one direction relative to the housing to project one of said dog members into abutting engagement with one of the ends of said sleeve member while inter-engaging with said shoulders on the other of said dog members in the retracted position to thereby releasably secure the housing to the mandrel member in relative positions to hold said dog members in their respective positions, the projected dog member having a portion coacting with the end of the sleeve member with which it is engaged operable in response to relative movement of the mandrel member in the opposite direction to release the housing from the mandrel member so as to reverse the positions of the dog members relative to the ends of the sleeve member and said shoulders.

2. A tool for use in longitudinally shifting a sleeve member in the bore of a well pipe, comprising, a mandrel member connectible to a wire line operating string, a tubular housing disposed for limited relative longitudinal movement about the mandrel member, two vertically spaced dog members mounted in the wall of the housing for radial movement between projected positions adapted to abuttingly engage the ends of said sleeve member and retracted positions permitting passage of the tool through the bore of the well pipe and said sleeve member, said dog members having spaced inwardly projecting shoulders, shoulder means carried by the mandrel member positioned thereon to coact with the shoulders on said dog members in response to longitudinal movement of the mandrel member in one direction relative to the housing to project one of said dog members into abutting engagement with one of the ends of said sleeve member while inter-engaging with the shoulders of said other of said dog members in the retracted position to thereby releasably secure the housing to the mandrel member in relative positions to hold said dog members in their respective positions, the projected dog member having a portion coacting with the end of the sleeve member with which it is engaged operable in response to relative movement of the mandrel member in the opposite direction to release the housing from the mandrel member so as to reverse the positions of the dog members relative to the ends of the sleeve member and said shoulders.

3. A tool for use in longitudinally shifting a sleeve member in the bore of a well pipe, comprising, a mandrel member connectible to a wire line operating string, a tubular housing disposed for limited relative longitudinal movement about the mandrel member, two vertically spaced dog members mounted in the wall of the housing for radial movement between projected positions adapted to abuttingly engage the ends of said sleeve member and retracted positions permitting passage of the tool through the bore of the well pipe and said sleeve member, said dog members having spaced inwardly projecting shoulders, shoulder means carried by the mandrel member positioned thereon to coact with the shoulders on said dog members in response to longitudinal movement of the mandrel member in one direction relative to the housing to project one of said dog members into abutting engagement with one of the ends of said sleeve member while inter-engaging with the shoulders of the other of said dog members in the retracted position to thereby releasably secure the housing to the mandrel member in relative positions to hold said dog members in their respective positions, the projected dog member having a portion coacting with the end of the sleeve member with which it is engaged operable in response to relative movement of the mandrel member in the opposite direction to release the housing from the mandrel member so as to reverse the positions of the dog members relative to the ends of the sleeve member and said shoulders, the longitudinal spacing between said shoulder means on the mandrel being greater than the spacing between the shoulders on the dog members by an amount such that the shoulder means may projectibly engage only one of said dog members at any terminal position of the mandrel.

4. A tool for use in longitudinally shifting a sleeve member in the bore of a well pipe, comprising, a mandrel member connectible to a wire line operating string, a tubular housing disposed for limited relative longitudinal movement about the mandrel member, two vertically spaced dog members mounted in the wall of the housing for radial movement between projected positions adapted to abuttingly engage the ends of said sleeve member and retracted positions permitting passage of the tool through the bore of the well pipe and said sleeve member, inwardly projecting shoulders on said dog members, shoulder means carried by the mandrel member positioned thereon to coact with said shoulders on said dog members in response to longitudinal movement of the mandrel member in one direction relative to the housing to project one of said dog members into abutting engagement with one of the ends of said sleeve member while inter-engaging with said shoulders on the other of said dog members in the retracted position to thereby releasably secure the housing to the mandrel member in relative positions to hold said dog members in their respective positions, the projected dog member having a portion coacting with the end of the sleeve member with which it is engaged operable in response to relative movement of the mandrel member in the opposite direction to release the housing from the mandrel member so as to reverse the positions of the dog members relative to the ends of the sleeve member and said shoulders, and resilient biasing means disposed between the opposite ends of said housing and the adjacent portions of the mandrel member.

5. A wire line-operated shifting tool insertable in a well pipe, comprising, a mandrel member, a tubular housing disposed for limited relative longitudinal movement about the mandrel member, two vertically spaced sets of circumferentially spaced dogs mounted in the wall of the housing for radial movement between projected positions extending to a diameter greater than the internal diameter of the well pipe and retracted positions defining a diameter less than the internal diameter of the well pipe, said dogs being generally rectangular in shape and having bevelled upper and lower edges, inwardly projecting lug members on said dogs, longitudinally spaced outwardly projecting lug members on the mandrel member positioned thereon to coact with the lug members on said sets of dogs in response to relative longitudinal movement in opposite directions between the mandrel member and the housing to alternatively move one of said sets of dogs to the projected position while contemporaneously releasing the other of said sets of dogs for movement to the retracted position wherein the lug members on said dogs and on said mandrel member are in axially interspersed relation.

6. A shifting tool according to claim 5 wherein the upper and lower edges of the lugs on said dogs and on said mandrel member are bevelled.

7. A shifting tool according to claim 5 wherein coil springs are mounted in compression between the opposite ends of said housing and the mandrel member.

8. A wire line-operated shifting tool insertable in a well pipe, comprising, a mandrel member, a tubular housing disposed for limited relative longitudinal movement about the mandrel member, two vertically spaced sets of circumferentially spaced dogs mounted in the wall of the housing for radial movement between projected positions extending to a diameter greater than the internal diameter of the well pipe and retracted positions defining a diameter less than the internal diameter of the well pipe, inwardly projecting lug members on said dogs, longitudinally spaced outwardly projecting lug members on the mandrel member positioned thereon to coact with the lug members on said sets of dogs in response to relative longitudinal movement in opposite directions between the mandrel member and the housing to alternatively move one of said sets of dogs to the projected position while contemporaneously releasing the other of said sets of dogs for movement to the retracted position wherein the lug members on said dogs and on said mandrel member are in axially interspersed relation, the longitudinal spacing between the lugs on the mandrel member being greater than that between the lugs on the dogs by an amount such that the lugs on the mandrel member may projectably engage the lugs on only one of said sets of dogs at any terminal position of the mandrel member relative to the housing.

9. A wire line-operated shifting tool insertable in a well pipe, comprising, a mandrel member, a tubular housing disposed for limited relative longitudinal movement about the mandrel member, vertically spaced dogs mounted in the wall of the housing for radial movement between projected positions extending to a diameter greater than the internal diameter of the well pipe and retracted positions defining a diameter less than the internal diameter of the well pipe, said dogs being generally rectangular in shape and having bevelled upper and lower edges, inwardly projecting lug members on said dogs, longitudinally spaced outwardly projecting lug members on the mandrel member positioned thereon to coact with the lug members on said sets of dogs in response to relative longitudinal movement in opposite directions between the mandrel member and the housing to alternatively move one of said dogs to the projected position while contemporaneously releasing the other dog for movement to the retracted position wherein the lug members on said dog and on the said mandrel member are in axially interspersed relation.

References Cited in the file of this patent

UNITED STATES PATENTS

| | | |
|---|---|---|
| 2,723,677 | Middleton | Nov. 15, 1955 |
| 2,818,925 | Garrett et al. | Jan. 7, 1958 |
| 2,924,278 | Garrett et al. | Feb. 9, 1960 |